United States Patent [19]

Okada

[11] Patent Number: 4,859,094

[45] Date of Patent: Aug. 22, 1989

[54] BRAILLE PRINTING PLATE

[76] Inventor: Chozo Okada, 23-20, Yagiyamahoncho 1-chome, Sendai-shi, Miyagi-ken, Japan

[21] Appl. No.: 128,380

[22] Filed: Dec. 3, 1987

[30] Foreign Application Priority Data

Jun. 3, 1986 [JP] Japan ................. 61-129961

[51] Int. Cl.[4] ................ B41J 3/32; B41M 3/16
[52] U.S. Cl. .................... 400/122; 101/368; 101/401.1; 434/114
[58] Field of Search ............. 400/122; 101/28, 301, 101/368, 401.1; 434/113, 114

[56] References Cited

U.S. PATENT DOCUMENTS

| | | | |
|---|---|---|---|
| 2,616,198 | 11/1952 | Sewell | 400/122 |
| 2,793,585 | 5/1957 | Granitsas | 101/28 |
| 4,551,102 | 11/1985 | Meinzer | 400/122 |
| 4,571,190 | 2/1986 | Zagler et al. | 400/122 |
| 4,650,352 | 3/1987 | Eriksson | 400/122 |

FOREIGN PATENT DOCUMENTS

| | | | |
|---|---|---|---|
| 169959 | 2/1986 | European Pat. Off. | 101/28 |
| 2649971 | 5/1978 | Fed. Rep. of Germany | 400/122 |
| 32995 | 2/1982 | Japan | 400/122 |

OTHER PUBLICATIONS

Franklin, "High Speed Embossing of Braille Masters" IBM Tech Disclosure Bulletin, vol. 11, No. 10, pp. 1296-1297, 3/69.

Primary Examiner—William Pieprz
Attorney, Agent, or Firm—Spencer & Frank

[57] ABSTRACT

A braille printing plate includes a male part formed of a board on which braille letters are formed by a braille-writer and balls loaded in braille-forming recesses appearing on the rear side of the board. The male part is alternatively formed by loading balls in recesses on a rear side of a braille-printed sheet formed using a braille printer and then piecing the same to a master board. A female part is formed of a board which has been pressed against raised portions constituting the braille letters on the male part. The male and female parts are binded at lateral edges thereof so as to be foldable at the binding.

6 Claims, 3 Drawing Sheets

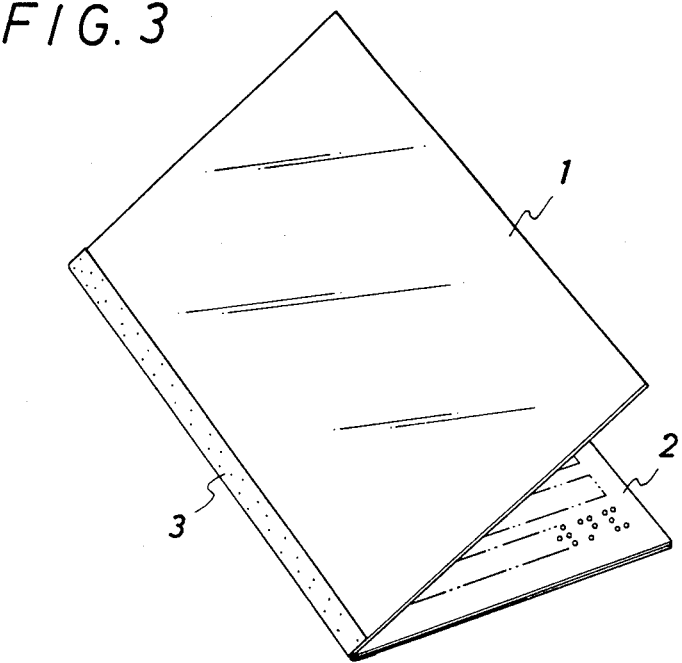
FIG. 3
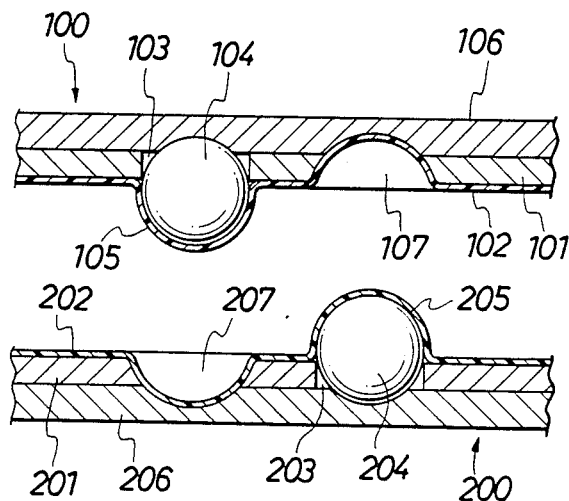
FIG. 4A
FIG. 4B

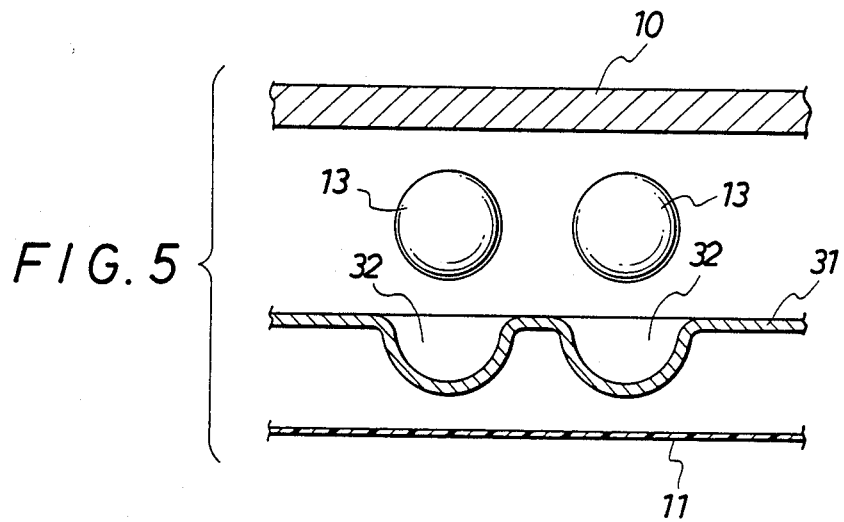
FIG. 5
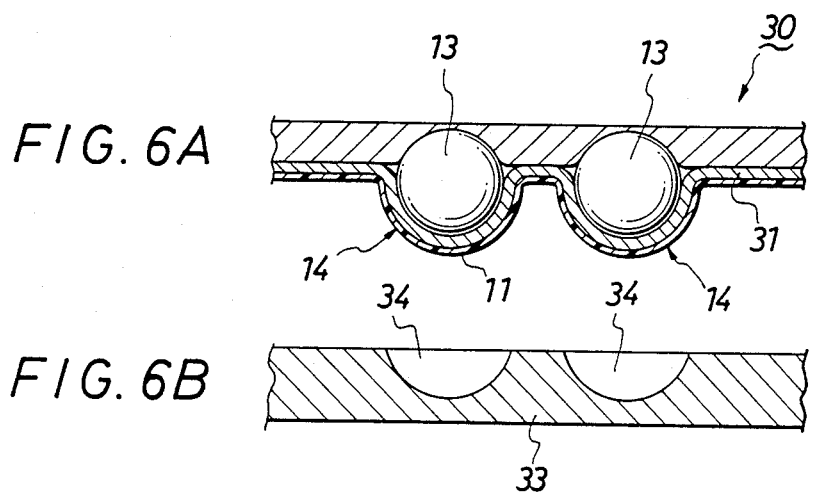
FIG. 6A
FIG. 6B

BRAILLE PRINTING PLATE

BACKGROUND OF THE INVENTION

The present invention relates to a braille printing plate.

It is known to use a braille writing instrument or braillewriter for braille printing. Additionally, the present inventor has previously developed a braille printing plate which can print braille without using a braille writing instrument or braillewriter, and can store the braille for a long time as a master plate, as is disclosed in European Patent Publication No. 169959.

In the inventor's above prior invention, braille is printed with use of a punched plate made of hard plastic or similar material, having all rows punched with dot holes, six of which correspond to one braille letter. (See the numeral 10 shown in FIG. 1 of the European Patent Publication No. 169959.) On one surface of the punched plate is pasted a ball retaining sheet such as a vinyl chloride sheet and on the other surface is pasted a dot hole sheet. The brailleforming dot holes are punched in the dot hole sheet with a stylus or braillewriter so as to project the ball retaining sheet outwardly, balls are then loaded in recesses formed in the ball retaining sheet, and thereafter a sheet is pasted on the dot hole sheet to provide a stable support for the balls. Thus, braille letters are formed and a master printing plate is obtained.

The above prior art using balls to form letters on the master printing plate is advantageous in that the braille letters will not be defaced even if printing is repeated, the printed braille letters are easy to read, two to three sheets can be clearly printed at one time, and the balls can be taken out after printing so that the balls and punched plate are available for repeated use.

Braillewriters differ somewhat from each other in the braille size and/or the line spacing, according to the manufacturer. If the master plate is to be made using the braillewriter, the punched plate is required to register with the braillewriter in the braille spacing. The prior art proposed by the inventor is suitable for producing the master plate with a stylus, but is faced with the aforementioned problem when using the braillewriter.

Recently, there has been developed a computer-aided braille writing machine, in which ordinary letters are input and computerized so as to print braille letters. Advantageously, a person without knowledge of braille can operate this machine. Further, data can be recorded in floppy disk and duplicated easily. The convenience of this machine is incomparable with the conventional braillewriter, but this braille writing machine and associated braille printer are so expensive that it is actually difficult for even a braille library to purchase them.

SUMMARY OF THE INVENTION

Accordingly, an object of the present invention is to solve the problems of the prior art and to provide a printing master plate which can print braille letters and eliminate the necessity of using the punched plate with all rows punched with dot holes.

The master plate of the present invention is provided by forming braille letters directly on a board such as cardboard with a braillewriter and loading balls in braille-forming recesses appearing on the rear side of the board. Alternatively, the master plate is provided by loading balls in recesses formed using a braille printer on the rear side of a braille-printed sheet and then pasting it on a master board. The ball-loaded board is a male part of the master plate, which is used in combination with a female counterpart thereto (female part) having recesses that are formed in a board by copying the raised portions of the male part.

The male and female parts of the master plate are openably binded at the lateral edges thereof so that the male and female parts can be folded one over the other. With a sheet of paper between them, the male and female parts are pressed between rollers of a braille print machine so as to print braille on the paper by means of the ball-containing projections formed on the male part. Further, if a rotary press type print machine is used to print braille, the male part is attached on one roller while the female part is attached on the other roller at the position registering with the male part. In this case, sheets of paper can be supplied continuously and therefore printing efficiency can be improved.

Further, it is possible to print on both surfaces of the paper by arranging projections and recesses with an appropriate spacing on the printing plate so that they appear on alternate lines.

Although the present invention uses the braillewriter to strike braille letters or uses the braille-printed sheet printed by the braille printer, it is also possible to use the conventional braille writing instrument to make the male part.

BRIEF DESCRIPTION OF THE DRAWINGS

These and other features and advantages of the invention may be more completely understood from the following detailed description of the preferred embodiments considered with the accompanying drawings in which:

FIGS. 1 to 3 illustrate a master plate for one-surface printing, and more particularly, FIG. 1 is a perspective view of male and female parts, FIG. 3 is a perspective view of the male and female parts connected together;

FIG. 4A is a sectional view of a part of a master plate for printing on both surfaces and FIG. 4B is a sectional view of a counterpart to be used in combination with the part shown in FIG. 4A;

FIG. 5 is a sectional view of components for making a male part according to another embodiment; and FIG. 6A is a sectional view of the male part formed as shown in FIG. 5 and FIG. 6B is a sectional view of a female part to be used in combination with the male part of FIG. 6A.

DETAILED DESCRIPTION OF THE PREFERRED EMBODIMENTS

The present invention provides one-surface printing and two-surface printing. First, the one-surface printing will be described. The master plate for one-surface printing comprises a pair of male and female parts, 1 and 2, which are openably connected on one edge by a binding cloth 3 a shown in FIG. 3.

Figure 1:
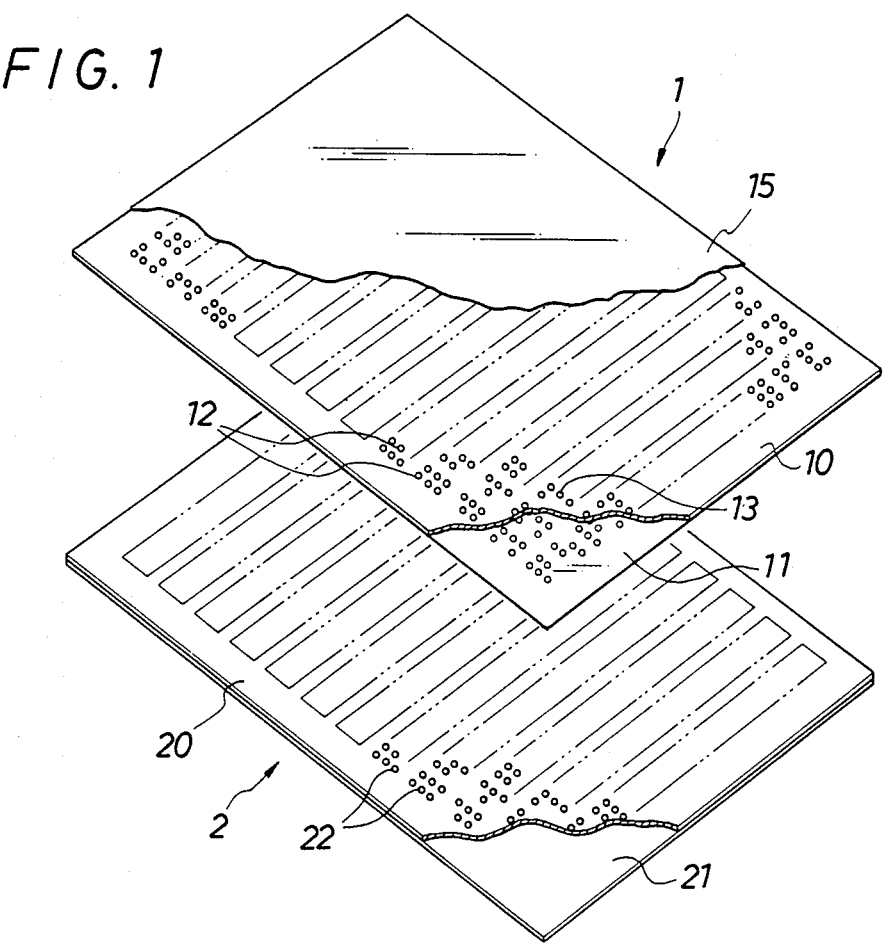
Figure 2A:
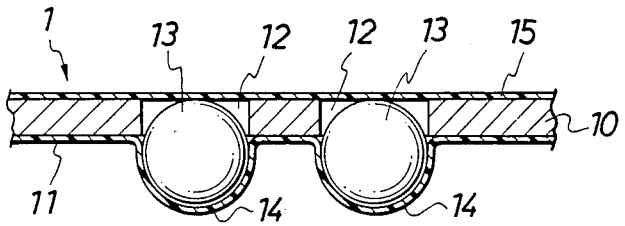
FIG. 2A is a sectional view of the male part.
Figure 2B:
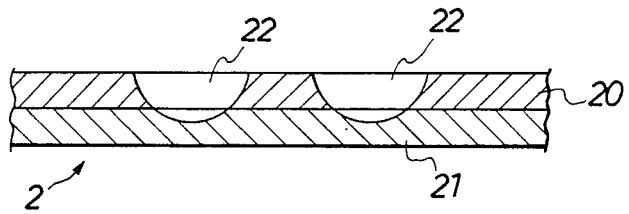
FIG. 2B is a sectional view of the female part to be used in combination with the male part of FIG. 2A.

As shown in FIGS. 2A and 2B, the male part 1 includes a board 10 such as cardboard, on one surface of which is pasted a soft plastic film 11 such as a polyethylene film. With this film 11 below, dot holes 12 are punched in the board 10 with use of a braille writing instrument or braillewriter, not shown.

Balls 13 made of steel or the like are loaded in the dot holes 12 and then a plastic film 15 is pasted on the surface from which the balls 13 are inserted, so as to form braille characters 14 on the board 10.

Thus, the male part 1 is formed with the ball-containing braille characters 14, which can be read from the back.

Further, the female part 2 uses a board thicker than that of the male part. The male and female parts, 1 and 2, are superposed with the braille characters 14 inside, and are connected by a binding cloth 3 attached at respective lateral edges thereof.

The male and female parts, 1 and 2, are pressed against each other so that the female part 2 is formed with braille receptacle holes (recesses) 22 copied from the braille characters 14 of the male part 1.

Although the female part 2 of the embodiment comprises two boards, 20 and 21, it is unnecessary to use two pasted together if a single board is of a thickness capable of forming the braille receptacle hole 22.

Printing is made by pressing together the male and female parts, 1 and 2, by pressure rollers of a print machine, with a sheet of paper held between the male and female parts. The hemispherical projections formed as braille characters 14 on the male part 1 are copied on the paper between the male and female parts 1 and 2, and braille is printed on the paper. The braille printed on the paper is easy to read if sheets are printed one by one, but it is also possible to print two to three sheets at one time.

After printing is completed, it is possible to store the master plate to be used at any desired time. If there is no need for the master plate, the boards cannot be recycled but the balls are available for repeated use.

Next, two-surface printing will be described. The master plate for the two-surface printing is provided with the braille receptacle holes between rows of the braille characters. In this case, the master plate has the structure that the male and female parts are the same in structure.

Referring to FIGS. 4A and 4B, a first part 100 of the master plate includes a board 101 and a plastic film 102 pasted thereon. Dot holes 103 are formed toward the film surface, and balls 104 are inserted in the dot holes 103 to form braille characters 105. Further, a second part 200 of the master plate which is a counterpart of the first part similarly includes a board 201 and a film 202 pasted thereon. In a similar manner with the first part, dot holes 203 are formed between the rows of the braille characters 105 and balls 204 are inserted in the dot holes 203 to form braille characters 205.

After boards, 106 and 206, are superposed on the outer surfaces of the boards, 101 and 201, respectively, both parts 100 and 200 are joined and pressed against each other, so as to copy the projections of the braille characters 105 and 205 onto the opposite boards and form braille receptacle holes 107 and 207 respectively.

The above parts 100 and 200 are attached by a binding cloth in an openable manner, and to print braille, they are pressed with a sheet of paper between the surfaces formed with the braille characters 105 and 205.

In an experiment conducted by the inventor, a braille printing plate such as is illustrated in FIGS. 2A and 2B was fabricated using 0.4 mm-thick board for boards 10 and 20, a 0.07 mm-thick soft plastic film for film 11 for covering the surface of balls 13, each ball being made of steel and 1.2 mm in diameter, and other materials of appropriate thickness such a plastic film 15 in order to make the braille master plate. The braille character 14 had a height of 0.6 mm, and with use of this master plate, the braille printed on paper could be more than 0.5 mm high which makes the braille easy to read.

In the case of the master plate for two-surface printing such as is illustrated in FIGS. 4A and 4B, a master plate was fabricated from materials in which boards 101 and 201 used for holding the balls 104 and 204 were of 0.3 mm thickness, and the boards 106 and 206 respectively superposed on the outside thereof was of 0.4 mm thickness.

The embodiment as shown in FIGS. 5 and 6 uses a braille-printed sheet printed by a braille printer. A male part 30 of the master plate includes such a braille-printed sheet 31, which has dot holes 32 to be loaded with balls 13 and is pasted to the board 10. Further, the printing surface, namely the surface where the balls 13 project from the board 10, has pasted thereto a soft plastic film 11 so as to form the braille characters 14.

The female part 33 of the master plate is made of a board in a similar manner as the male part 30 and has a thickness capable of forming dot receptacle holes 34 corresponding to the raised portions of the braille characters 14.

The braille-printed sheet 31 may be a relatively thin sheet of paper of the type for ordinary use in a printer for a computer. As the purpose of the braille-printed sheet 31 is not to be read itself but to be loaded with balls in the dot holes 32 thereof and then pasted to a board, the readily available computer paper is sufficient and economical.

In a similar manner to that applied with the structure shown in FIG. 3 as described above, the braille characters on the male part 30 are copied onto the female part 33 and these male and female parts are openably connected at respective lateral edges by a binding cloth to make them suitable for printing.

Although the master plate as shown in FIGS. 6A and 6B is for one-surface printing, it is also possible to make a two-surface printing master plate according to the embodiment shown in FIGS. 5A and 5B and 6A and 6B.

The invention now being fully described, it will be apparent to one of ordinary skill in the art that many changes and modifications can be made thereto without departing from the spirit or scope of the invention as set forth herein. The present disclosure relates to the subject matter disclosed in Japanese Application No. 61-129961 of June 3, 1986, the entire specification of which is incorporated herein by reference.

What is claimed is:

1. A braille printing plate, comprising:
   a male part including a first board having dot holes selectively formed therein only at locations defining data to be printed in the form of braille characters, a deformable plastic film fixed to said first board and covering one side of said first board, and balls in all of said dot holes projecting outwardly so as to deform said film outwardly therewith, said film thereby having an exterior surface having projecting portions corresponding to the locations of said balls defining raised braille characters; and
   a female part including a second board having dot hole receptables in one-to-one correspondence with said projecting portions directly opposing and shaped to respective ones of said projecting portions, whereby a sheet placed between said male part and said female part will have the raised braille characters printed thereon by pressing said female part and said male part together such that said projecting portions are received in the opposing dot hole receptacles.

2. A braille printing plate as in claim 1, further comprising a binding cloth openable connecting said female part and said male part.

3. A braille printing plate as in claim 1, further comprising means, disposed on a side of said first board opposite said one side, for retaining said balls in said dot holes.

4. A braille printing plate as in claim 1, wherein said first board is formed of cardboard.

5. A braille printing plate, comprising:
a male part including a braille printing sheet having first and second opposite sides, said braille printed sheet having dot holes only at selected locations defining data to be printed in the form of braille characters, projecting outwardly on said first side and open on said second side, balls loaded in all of said holes, and a board fixed to said second side so as to cover said dot holes, said second side thereby having projecting portions corresponding to the locations of said balls and defining raised braille characters; and
a female part having dot hole receptables in one-to-one corresondence with said projecting portions directly opposing and shaped to respective ones of said projecting portions, whereby a sheet placed between said male part and said female part will have the raised braille characters printed thereon by pressing said female part and said male part together such that said projecting portions are received in the opposing dot hole receptacles.

6. A braille printing plate as in claim 5, wherein said sheet is a paper sheet.

* * * * *